United States Patent
Wang et al.

(10) Patent No.: US 12,307,545 B2
(45) Date of Patent: May 20, 2025

(54) METHOD, ELECTRONIC DEVICE, AND COMPUTER PROGRAM PRODUCT FOR PROCESSING VIRTUAL AVATAR

(71) Applicant: Dell Products L.P., Round Rock, TX (US)

(72) Inventors: Zijia Wang, WeiFang (CN); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 447 days.

(21) Appl. No.: 17/985,578

(22) Filed: Nov. 11, 2022

(65) Prior Publication Data
US 2024/0135482 A1    Apr. 25, 2024

(30) Foreign Application Priority Data
Oct. 18, 2022    (CN) .......................... 202211275814.7

(51) Int. Cl.
*G06T 1/00* (2006.01)
*G06T 13/40* (2011.01)

(52) U.S. Cl.
CPC ............ *G06T 1/0021* (2013.01); *G06T 13/40* (2013.01); *G06T 2207/20081* (2013.01)

(58) Field of Classification Search
None
See application file for complete search history.

(56) References Cited

U.S. PATENT DOCUMENTS 6,408,082 B1 * 6/2002 Rhoads .............. H04N 1/32154
704/E19.009
11,281,928 B1 * 3/2022 Hoehne .................... G06T 7/11
(Continued)

FOREIGN PATENT DOCUMENTS

WO    WO0039954 A1 * 12/1998 ............... H04L 9/00

OTHER PUBLICATIONS

S. Baluja, "Hiding Images in Plain Sight: Deep Steganography," 31st Conference on Neural Information Processing Systems, Dec. 2017, 11 pages.
(Continued)

*Primary Examiner* — Paul R Fisher
(74) *Attorney, Agent, or Firm* — Ryan, Mason & Lewis, LLP (57) ABSTRACT

Embodiments of the present disclosure relate to a method, an electronic device, and a computer program product for processing a virtual avatar. The method includes generating an image feature of the virtual avatar based on a plurality of image blocks of the virtual avatar and corresponding positions of the plurality of image blocks in the virtual avatar. The method further includes generating, based on a watermark to be added to the virtual avatar, a text feature associated with text of the watermark. The method further includes generating a watermarked virtual avatar based on the image feature and the text feature, wherein the watermark is invisible to human beings and identifies an identity of a user of the virtual avatar in a metaverse. Through embodiments of the present disclosure, identification of a virtual avatar, illustratively for verification and/or tracking purposes can be achieved without affecting the appearance of the virtual avatar.

20 Claims, 8 Drawing Sheets

(56) References Cited

U.S. PATENT DOCUMENTS

| | | | |
|---|---|---|---|
| 2008/0059801 A1* | 3/2008 | Cohen | G06F 21/57 |
| | | | 713/176 |
| 2011/0066860 A1* | 3/2011 | Dettinger | H04L 67/131 |
| | | | 713/176 |
| 2021/0178274 A1* | 6/2021 | St-Pierre | G06N 7/01 |
| 2021/0365677 A1* | 11/2021 | Anzenberg | G06N 3/045 |

OTHER PUBLICATIONS

N. Papernot et al., "The Limitations of Deep Learning in Adversarial Settings," IEEE European Symposium on Security & Privacy, arXiv:1511.07528v1, Nov. 24, 2015, 16 pages.

A. Dosovitskiy et al., "An Image is Worth 16×16 Words Transformers for Image Recognition at Scale," The International Conference on Learning Representations, arXiv:2010.11929v2, Jun. 3, 2021, 22 pages.

D. A. Hudson et al., "Generative Adversarial Transformers," Proceedings of the 38th International Conference on Machine Learning, Jul. 2021, 13 pages.

T. Zong et al., "Robust Histogram Shape Based Method for Image Watermarking," IEEE Transactions on Circuits and Systems for Video Technology, May 2015, 14 pages, vol. 25, No. 5.

M. Zareian et al., "Robust Quantisation Index Modulation-based Approach for Image Watermarking," IET Image Process, Jul. 2013, pp. 432-441, vol. 7, No. 5.

W. Tang et al., "Automatic Steganographic Distortion Learning using a Generative Adversarial Network," IEEE Signal Processing Letters, Oct. 2017, pp. 1547-1551, vol. 24, No. 10.

H. Kandi et al., "Exploring the Learning Capabilities of Convolutional Neural Networks for Robust Image Watermarking," Computers & Security, Mar. 2017, pp. 247-268, vol. 65.

D. Li et al., "A Novel CNN Based Security Guaranteed Image Watermarking Generation Scenario for Smart City Applications," Information Sciences, Accepted Manuscript, Feb. 26, 2018, 28 pages.

S.-M. Mun et al., "Finding Robust Domain from Attacks: A Learning Framework for Blind Watermarking," Neurocomputing, Apr. 2019, pp. 191-202, vol. 337.

J. Ouyang et al., "Color Image Watermarking Based on Quaternion Fourier Transform and Improved Uniform Log-polar Mapping," Computers and Electrical Engineering, Aug. 2015, pp. 419-432, vol. 46.

* cited by examiner

METHOD, ELECTRONIC DEVICE, AND COMPUTER PROGRAM PRODUCT FOR PROCESSING VIRTUAL AVATAR

RELATED APPLICATION

The present application claims priority to Chinese Patent Application No. 202211275814.7, filed Oct. 18, 2022, and entitled "Method, Electronic Device, and Computer Program Product for Processing Virtual Avatar," which is incorporated by reference herein in its entirety.

FIELD

Embodiments of the present disclosure relate to the field of computers, and more particularly, to a method, an electronic device, and a computer program product for processing a virtual avatar.

BACKGROUND

With the development of augmented reality/virtual reality (AR/VR), human beings and digital technologies are approaching each other both conceptually and physically. This progress can be easily observed from various ways in which digital media reshape the human body, whether through an image shared online through social media platforms, mobile technologies, or in any other way. In a metaverse, users represent themselves by using generated virtual avatars. In the metaverse, artificial intelligence (AI) technology may be used to create fake virtual avatars, resulting in identity theft.

SUMMARY

Embodiments of the present disclosure provide a method, an electronic device, and a computer program product for processing a virtual avatar.

According to a first aspect of the present disclosure, a method for processing a virtual avatar is provided. The method includes generating an image feature of the virtual avatar based on a plurality of image blocks of the virtual avatar and corresponding positions of the plurality of image blocks in the virtual avatar. The method further includes generating, based on a watermark to be added to the virtual avatar, a text feature associated with text of the watermark. The method further includes generating a watermarked virtual avatar based on the image feature and the text feature, wherein the watermark is invisible to human beings and identifies an identity of a user of the virtual avatar in a metaverse.

According to a second aspect of the present disclosure, an electronic device is further provided. The electronic device includes a processor and a memory coupled to the processor, wherein the memory has instructions stored therein, and the instructions, when executed by the processor, cause the device to execute actions. The actions include generating an image feature of the virtual avatar based on a plurality of image blocks of the virtual avatar and corresponding positions of the plurality of image blocks in the virtual avatar. The actions further include generating, based on a watermark to be added to the virtual avatar, a text feature associated with text of the watermark. The actions further include generating a watermarked virtual avatar based on the image feature and the text feature, wherein the watermark is invisible to human beings and identifies an identity of a user of the virtual avatar in a metaverse.

According to a third aspect of the present disclosure, a computer program product is provided, wherein the computer program product is tangibly stored on a non-transitory computer-readable medium and includes computer-executable instructions, and the computer-executable instructions, when executed by a device, cause the device to execute the method according to the first aspect.

This Summary is provided to introduce the selection of concepts in a simplified form, which will be further described in the Detailed Description below. The Summary is neither intended to identify key features or principal features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which.

In all the accompanying drawings, identical or similar reference numerals indicate identical or similar elements.

DETAILED DESCRIPTION

Illustrative embodiments of the present disclosure will be described in more detail below with reference to the accompanying drawings. Although the accompanying drawings show some embodiments of the present disclosure, it should be understood that the present disclosure can be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below. In addition, all specific numerical values herein are examples, which are provided only to aid in understanding, and are not intended to limit the scope.

In order to avoid the theft of a virtual avatar, or to be able to trace how a stolen virtual avatar is used after the virtual avatar is stolen, and to prove an ownership of the virtual avatar, it is desirable to embed a watermark in the virtual avatar. However, in order not to affect the appearance of the virtual avatar (sometimes referred to as an image hereinafter, and sometimes a virtual avatar and an image are not distinguished in the present disclosure), it is desirable to embed an invisible watermark, that is, the watermark is invisible to human eyes.

Therefore, a method for embedding an invisible watermark is presented in the present disclosure. Using the method, a watermark can be invisibly embedded in a virtual avatar without affecting the appearance of the virtual avatar. Specifically, a text feature of the watermark is used to influence the change of an image feature of the virtual avatar, so that the appearance of the watermarked virtual avatar is similar to that of the original virtual avatar, and the text feature of the watermark is integrated. That is, the feature of the watermarked virtual avatar is constrained by both the image feature and the text feature.

Figure 1:
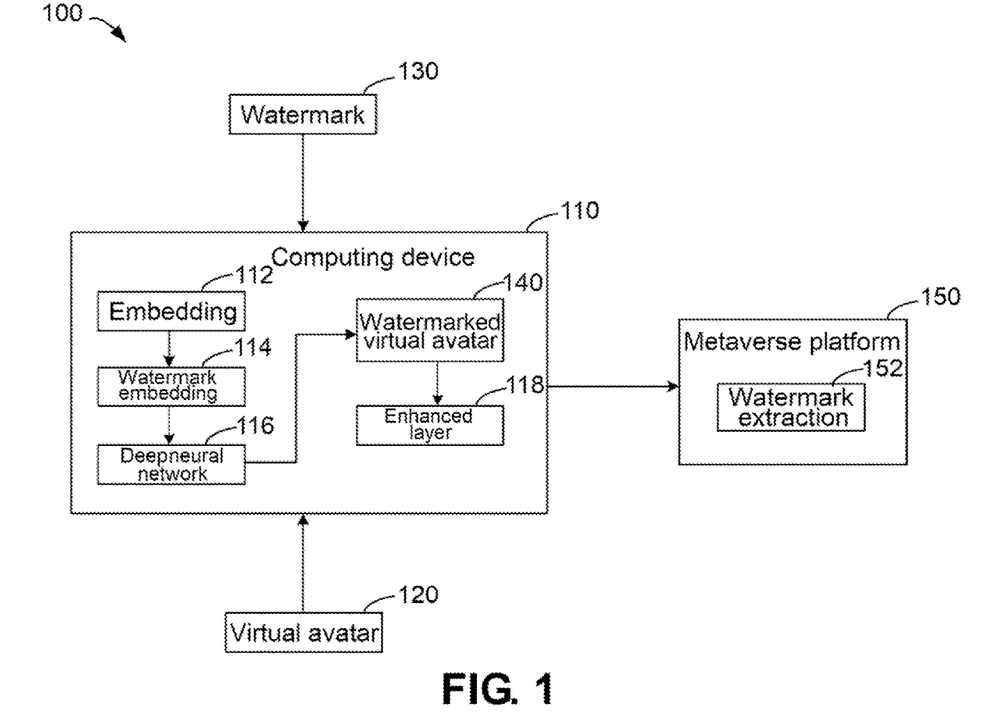
FIG. 1 shows a schematic diagram of an example environment in which an embodiment of the present disclosure may be implemented.

FIG. 1 shows a schematic diagram of example environment 100 in which an embodiment of the present disclosure may be implemented. As shown in FIG. 1, example environment 100 may include computing device 110. Computing device 110 may acquire virtual avatar 120 and watermark 130. As an example, virtual avatar 120 is generally acquired as an image, and watermark 130 is generally acquired as text. Of course, it is not intended to limit the form of virtual avatar 120 and watermark 130 in the present disclosure.

In computing device 110, acquired watermark 130 may first be converted by embedding 112 into a vector for processing by, for example, a Transformer model. During watermark embedding 114, a textual feature of watermark 130 may be embedded into the vector to generate a text feature. In deep neural network 116, a feature of the image of the virtual avatar may be extracted to form a graphic feature. The image feature and the text feature may be fused to generate watermarked virtual avatar 140. Image channels of watermarked virtual avatar 140 may be increased by enhanced layer 118.

Watermarked virtual avatar 140 may be delivered to metaverse platform 150. In metaverse platform 150, the watermark of received watermarked virtual avatar 140 may be extracted by watermark extraction 152. As an example, the metaverse platform may be a VR device of a user, a personal computer, a server of a metaverse operator, or the like.

It should be understood that the architecture and functions of example environment 100 are described for illustrative purposes only, without implying any limitation to the scope of the present disclosure. Embodiments of the present disclosure may also be applied to other environments having different structures and/or functions.

Figure 2:
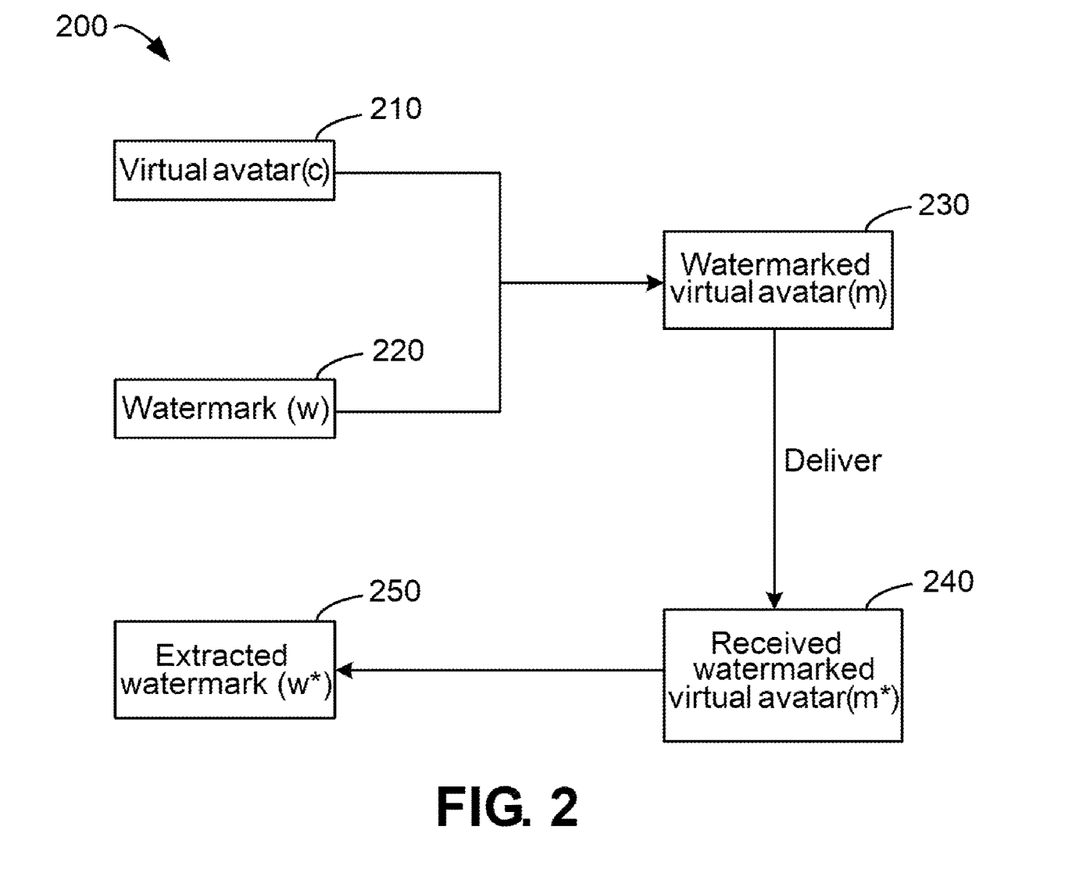
FIG. 2 shows a block diagram of a process for processing, delivering, and extracting a watermarked virtual avatar according to an example implementation of the present disclosure.

FIG. 2 shows a block diagram of process 200 for processing, delivering, and extracting a watermarked virtual avatar according to an example implementation of the present disclosure. Process 200 describes a process of processing and delivering a virtual avatar in the metaverse. A general principle of process 200 is inserting watermark w into virtual avatar c to generate watermarked virtual avatar m that is to be transmitted over a communication channel. A receiving end extracts watermark w* from received watermarked virtual avatar m*. If some distortion or attack occurs during transmission, it may be a modified version of m. Therefore, it is desirable to ensure the integrity of the watermark, that is, to minimize differences w and w* between the two.

In a conventional strategy, an image watermarking task is formulated as reserving some parts from the virtual avatar for watermarking. For example, watermark w is embedded in an image domain of virtual avatar c at some scales, as shown in Equation (1):

$$m = \alpha D(c) + \beta w \quad (1)$$

where $\alpha$ and $\beta$ are weights controlling the watermark intensity, and $D(c)$ denotes the image domain of a covered image. Different optimization schemes may be applied to control the embedding and extract watermark w* from watermarked virtual avatar m* according to the user's purpose.

In contrast, the image watermarking is regarded as an image fusion task in the present disclosure. Two input spaces of the watermark and the virtual avatar, namely, $W=R^{D_1}$ and $C=R^{D_2}$, are given. The watermark space is first mapped to one of its latent spaces (feature space $W_f=R^{d_1}$) by a function $\mu: W \rightarrow W_f$, and then the watermark embedding is performed by a mapping function $\sigma: \{W_f, C\} \rightarrow M$. The watermark feature space and the input virtual avatar space are fused to generate an intermediate latent space $M=R^{d_2}$, and M is the space of the watermarked virtual avatar with two main constraints. The visual appearance of M is similar to that of C, and the features of M are related to features of $W_f$. Therefore, M has desired properties of the watermarked virtual avatar. On the other hand, the watermark extraction is performed by two mapping functions, $\sigma: M \rightarrow W_f$ reconstructs the feature space $W_f$ from M, and $\gamma: W_f \rightarrow W$ reconstructs data of the watermark from $W_f$.

As an example, virtual avatar 210 and watermark 220 are processed (for example, by computing device 110 in FIG. 1) to generate watermarked virtual avatar 230. After watermarked virtual avatar 230 is delivered to a destination (for example, metaverse platform 150 in FIG. 1), in response to received watermarked virtual avatar 240, the metaverse platform may extract the watermark therefrom to obtain extracted watermark 250. In this way, the watermark does not affect the appearance of the virtual avatar, and can be extracted and used for confirming the authenticity and/or ownership of the virtual avatar. For example, the identity of the user of the virtual avatar in the metaverse is verified. The watermark may be used for tracking the use of the virtual avatar. For example, a behavior of using the virtual avatar to generate another image may be tracked.

A process according to an embodiment of the present disclosure will be described in detail below with reference to FIG. 3 to FIG. 9. For ease of understanding, specific data mentioned in the following description is illustrative and is not intended to limit the protection scope of the present disclosure. It should be understood that embodiments described below may also include additional actions not shown and/or may omit actions shown, and the scope of the present disclosure is not limited in this regard.

Figure 3:
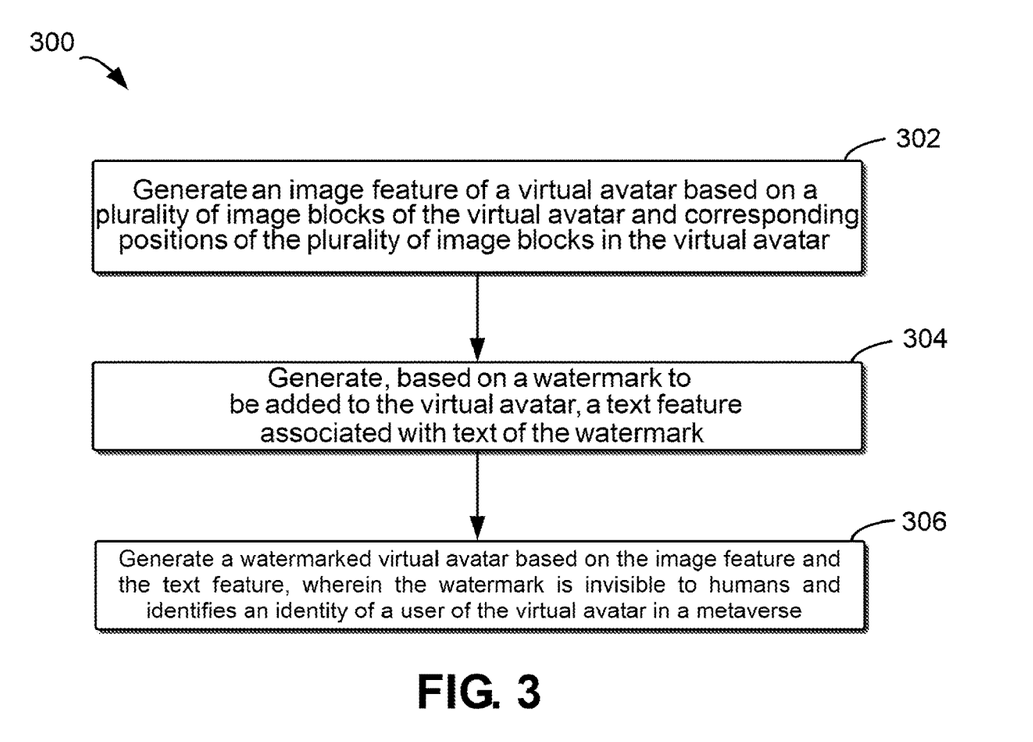
FIG. 3 shows a flow chart of a method for processing a virtual avatar according to an example implementation of the present disclosure.

FIG. 3 shows a flow chart of method 300 for processing a virtual avatar according to an example implementation of the present disclosure. At block 302, an image feature of a virtual avatar is generated based on a plurality of image blocks of the virtual avatar and corresponding positions of the plurality of image blocks in the virtual avatar. It should be understood that, in a deep learning model, a feature is an abstract concept and does not necessarily correspond to a certain physical meaning or some set of physical meanings of the virtual avatar. For the sake of convenience, a feature regarding the virtual avatar is called an image feature.

As an example, if it is assumed that the virtual avatar has 100×100 pixels, the virtual avatar may be divided into 100 10×10 image blocks. Based on the feature of each image block and the feature of the position of each image block in the entire virtual avatar, an image feature of each image block is determined separately (for example, by combining the two). The number of vectors in the image feature is the same as the number of the image blocks, and the vector of each image feature may be referred to as a visual mark (that is, a visual token). After the image features of all the image blocks are determined, the image features of the 100 image blocks may be combined to form an image feature of the virtual avatar. As for the process of determining the image feature, an example implementation of generating an image feature is described below with separate reference to FIG. 4.

At block 304, based on a watermark to be added to the virtual avatar, a text feature associated with text of the watermark is generated. As an example, the text of the watermark is encoded into a deep neural network to obtain the text feature.

The acquired text feature is in units of tokens, and it may be construed that the number of vectors in the text feature is the same as the number of tokens. A vector in each text feature may be referred to as a text lemma (that is, a text token). As for the process of determining the text feature, an example implementation of determining a text feature is described below with separate reference to FIG. 5.

At block 306, a watermarked virtual avatar is generated based on the image feature and the text feature, where the watermark is invisible to human beings and identifies an identity of a user of the virtual avatar in a metaverse. As an example, a trained deep neural network may acquire the image feature and the text feature, and generate an image feature fused with the text feature. The image feature fused with the text feature is further converted into an image, and then the watermarked virtual avatar is obtained. As for the process of watermarking, an example implementation of watermarking will be described below with separate reference to FIG. 6A to FIG. 6C.

In this way, the effect of adding the watermark to the virtual avatar is achieved. Through embodiments of the present disclosure, the watermark can be made invisible to human beings without affecting the appearance of the virtual avatar. At the same time, because the watermark can be extracted, it can be used for verifying the identity of the user of the virtual avatar in the metaverse and tracking the usage of the virtual avatar after it is stolen.

Figure 4:
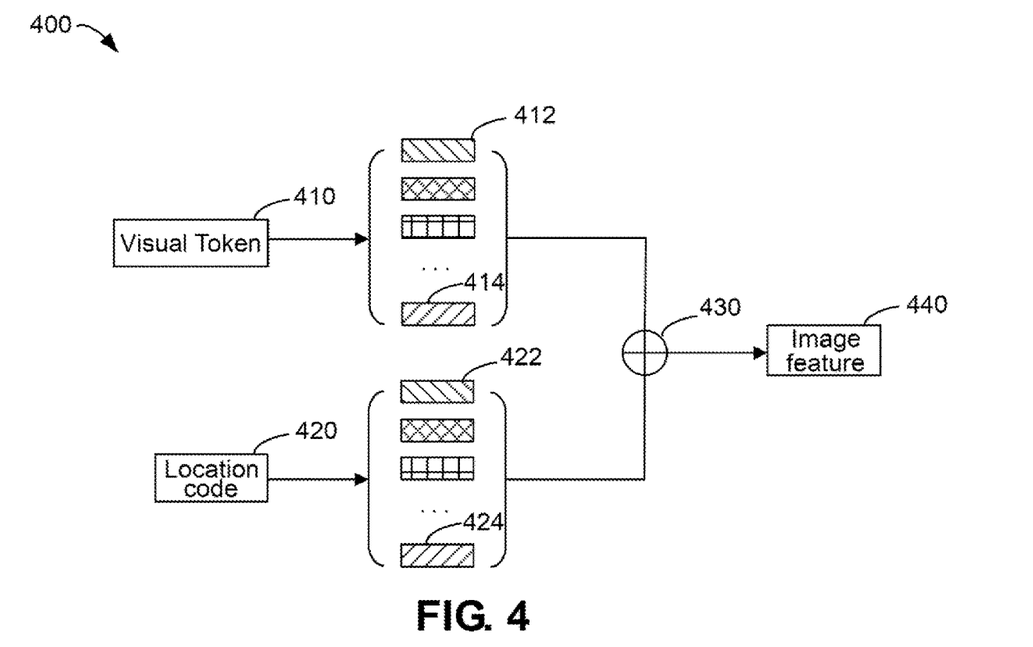
FIG. 4 shows a schematic diagram of a process for generating an image feature according to an example implementation of the present disclosure.

FIG. 4 shows a schematic diagram of process 400 for generating an image feature according to an example implementation of the present disclosure. Process 400 starts with a visual token sequence $c \in \mathbb{R}^{m \times (p^2 \times d)}$ learned through an input layer. Specifically, d denotes the channel dimension (for example, three image channels RGB), p×p is the block size of a visual token, and m is the length of the visual token sequence. In order to maintain location information of each token, a location code $p \in \mathbb{R}^{m \times (p^2 \times d)}$ is added for each visual token according to a common paradigm. For simplicity, symbols of the visual tokens added with the location codes are rewritten as $\{c_1, \ldots, c_m\}$, where $c_i \in \mathbb{R}^d$.

As an example, a feature may be extracted from visual token 410 corresponding to each image block, so as to obtain vectors of the same length, such as feature vector 412 or feature vector 414. The location of each image block in the whole virtual avatar may be encoded. For example, location code 420 may be obtained by one-hot encoding. A feature of location code 420 may be extracted to obtain feature vector 422 or feature vector 424. At 430, the feature vector of the image block and the feature vector of its corresponding location may be concatenated. For example, feature vector 412 and feature vector 422 as well as feature vector 414 and feature vector 424 may be concatenated to obtain image feature 440. It should be understood that the image feature is a vector matrix including a plurality of feature vectors.

Figure 5:
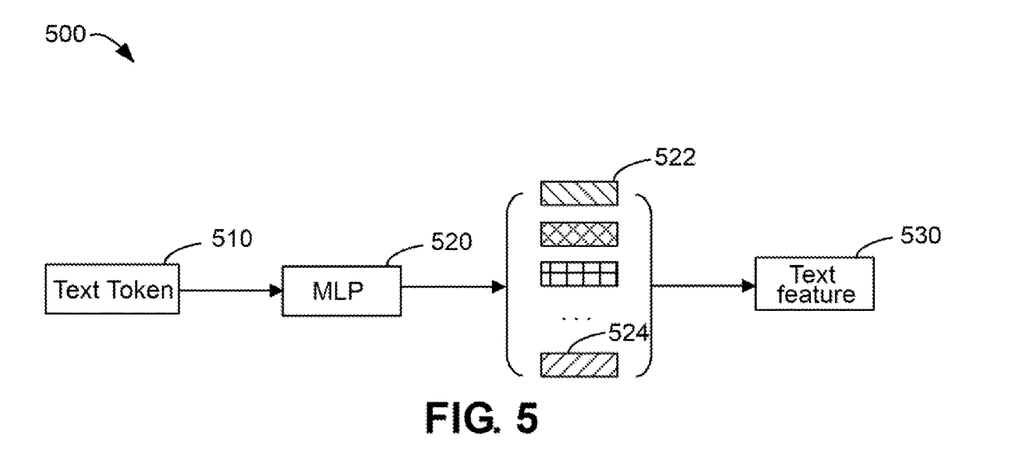
FIG. 5 shows a schematic diagram of a process of generating a text feature according to an example implementation of the present disclosure.

FIG. 5 schematically illustrates a schematic diagram of process 500 of generating a text feature according to an example implementation of the present disclosure. A main principle of generating the text feature is that watermark code z from an input latent space of watermark Z is given, a mapping network uses a plurality of fully connected layers MLP to map input watermark code z to a set of different watermark tokens, and these watermarks belong to a space $\{s_1, \ldots, s_n\} \in \mathcal{S}$, where $s_i \in \mathbb{R}^d$. In each self-attention layer of FIG. 6A, the watermark tokens are paired with a set of learnable semantic embeddings as key-value structures. Modeled by a Transformer model, all visual tokens will be matched with the semantic embeddings, and then a new style will be obtained from the watermark tokens based on the matching results. The acquired new style is used for controlling values of the visual tokens, which is eventually decoded into an image. Therefore, this token-based style control may provide content-aware and fine-grained style learning for image synthesis.

As an example, the text of the watermark is segmented to obtain text tokens 510. A text feature is extracted for each text token via fully connected layer MLP 520 to generate feature vectors related to the text, such as feature vector 522 or feature vector 524. The generated feature vectors may form text feature 530. It should be understood that the text feature is also a vector matrix including a plurality of feature vectors.

Figure 6A:
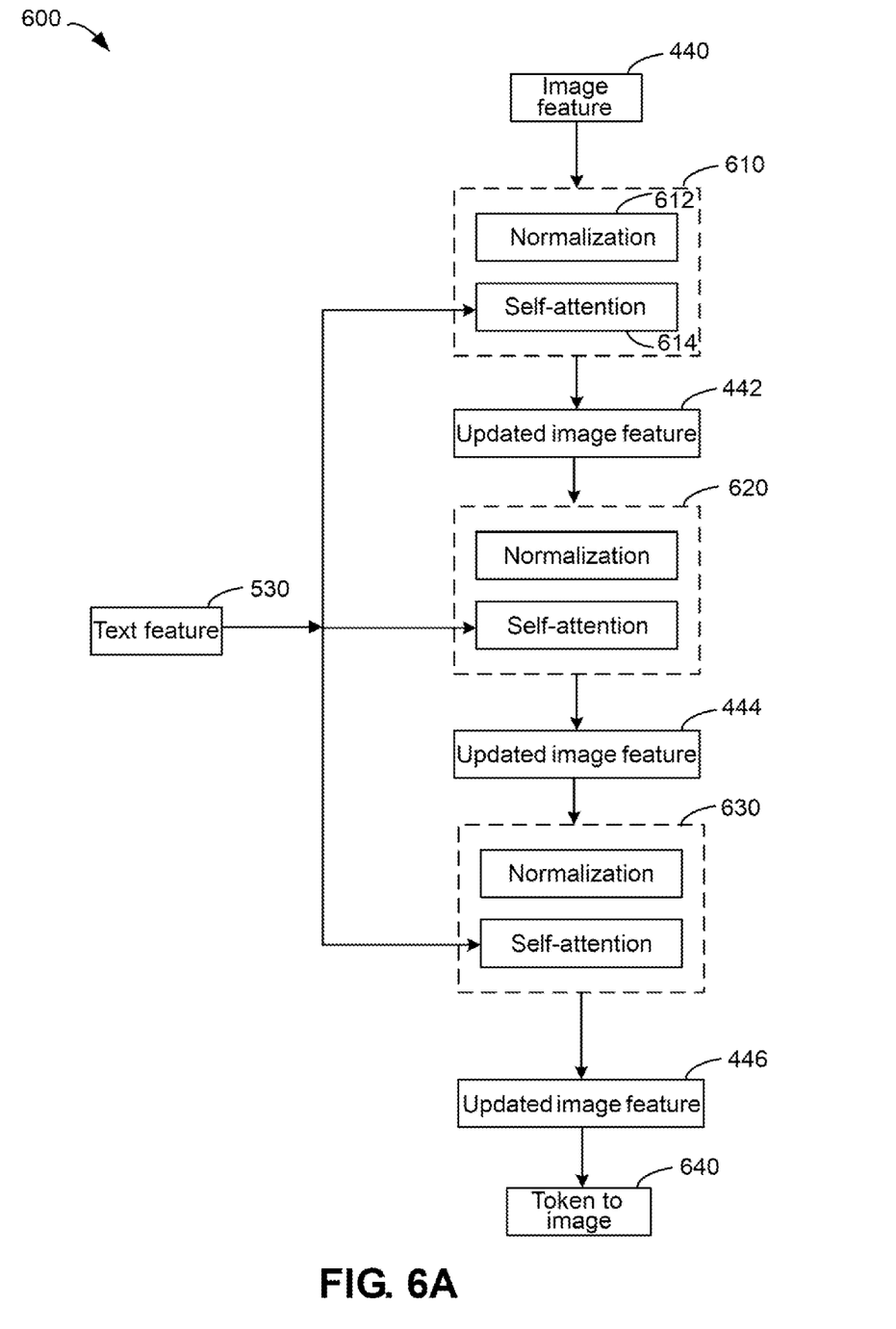
FIG. 6A shows a block diagram of a process of watermarking according to an example implementation of the present disclosure.

FIG. 6A shows a block diagram of process 600 for watermarking according to an example implementation of the present disclosure. In general, process 600 consists of a plurality of layers of watermarking modules (for example, block 610, block 620, and block 630), and each watermarking module consists of a normalization layer and a self-attention layer. Specifically, the normalization layer removes a style from the previous layer by alleviating the dependence on raw statistic data of the input image feature. Meanwhile, the self-attention layer assigns a new style from the current layer to the visual token. In particular, the new style is computed based on pairwise interactions between text tokens and visual tokens via a cross-attention mechanism.

As an example, the normalization layer applies normalization to the input visual token to remove the style from the previous layer, which is denoted as:

$$\text{Norm}(c_i)=(c_i-\mu(c_i))/\sigma(c_i), i=1,\ldots,m, \quad (2)$$

where each $c_i \in \mathbb{R}^d$ denotes a visual token, d denotes the dimension of each visual token, and m denotes the length of the visual token sequence.

As an example, image feature 440 may be input into block 610. At block 610, image feature 440 is normalized in block 612. Normalized image feature 440 is based on text feature 530, and updated image feature 442 is generated by a self-attention mechanism 614. Similarly, updated image feature 442 is input into block 620. At block 620, updated image feature 442 is normalized. Normalized and updated image feature 442 is also based on text feature 530, and updated image feature 444 is generated by the self-attention mechanism.

Iteratively, updated image feature 444 is input into block 630. At block 630, updated image feature 444 is normalized. Normalized and updated image feature 444 is also based on text feature 530, and updated image feature 446 is generated by the self-attention mechanism. It is worth noting that the number of iterations may be determined according to the effect of training the deep learning model, which is not limited to three times in this example.

After updated image feature 446 is generated, the feature may be converted into image 640 based on updated image feature 446 to acquire the watermarked virtual avatar. Key feature weights are extracted many times by the self-attention mechanism, and therefore, image 640 acquired in this way may avoid the situation where some features are ignored due to using the self-attention mechanism only once. Therefore, the text feature and the image feature may be better fused together, and important features that are easy to be ignored may be avoided or reduced.

Figure 6B:
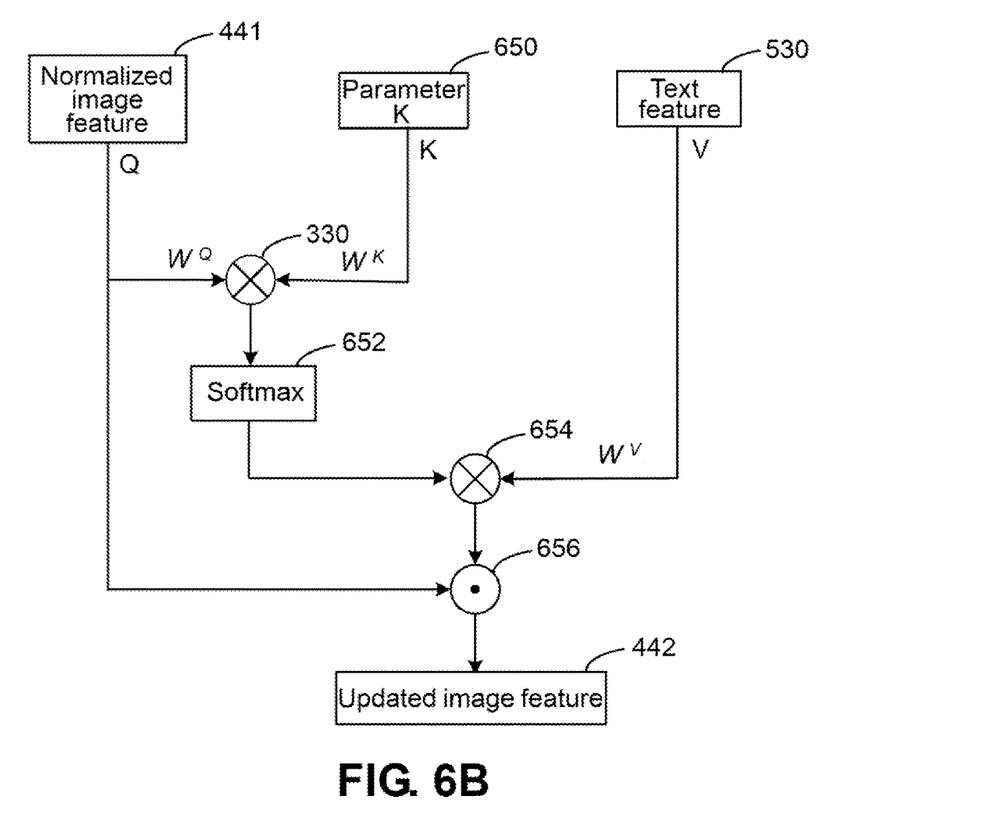
FIG. 6B shows a flow chart of a process for self-attention according to an example implementation of the present disclosure.

FIG. 6B shows a flow chart of a process for self-attention according to an example implementation of the present disclosure. The self-attention mechanism here is mainly based on a principle that, after normalization, a new style is computed to control the input visual token. In the self-attention layer, text tokens are paired with a set of learnable semantic embeddings as key-value structures. Given $\{c_1, \ldots, c_m\}$, from a visual token and a textual token belonging to $\{s_1, \ldots, s_n\} \in S$, a new style of the token is computed by an attention mechanism:

$$S' = \text{Attention}(C, K, S) = \text{softmax}\left(\frac{CK^T}{\sqrt{d}}\right)S \quad (3)$$

where $S' \in \mathbb{R}^{m \times d}$ denotes the new style of all visual tokens, and the input visual tokens are packaged into a matrix $C \in \mathbb{R}^{m \times d}$. Similar to the text tokens, matrix $S \in \mathbb{R}^{n \times d}$, and matrix $K \in \mathbb{R}^{n \times d}$ may be used for learnable semantic embeddings, where each row vector represents learned semantics.

Through this cross-attention mechanism, a new token-based granularity style may be acquired according to the matching results for self-attention. In particular, tokens with similar semantics will have similar styles (for example, two eyes have the same color). In this way, participating regions of different key-value pairs (that is, semantic style embeddings) are visualized, and learned embedding parameter K may be found to participate in meaningful image regions.

The attention result of the present disclosure is used as a new style by enlarging each channel of the visual token:

$$C' = C \odot S' \quad (4)$$

where each row vector in $C \in \mathbb{R}^{m \times d}$ denotes a visual token, and $\odot$ denotes an element by element multiplication. This self-attention may influence operations of subsequent embedding layers (for example, implemented through a fully connected layer), thereby controlling the style of the generated image.

As an example, at block 610, at 330, normalized image feature 441 may be used as a query vector, parameter K 650 learned by the deep learning model may be used as a key vector, and the two may be combined. Normalized image feature 441 after the combination is subjected to softmax function 652. At 654, text feature 530 is used for a value vector, which is combined with normalized image feature 441 subjected to softmax function 652, and a weight set (also referred to as a first weight set) is calculated. At 656, normalized image feature 441 subjected to softmax is multiplied with the weight set vector by vector, so as to generate updated image feature 442. It should be understood that a similar process is repeated in subsequent block 620 or block 630. For example, at block 620, a second weight set is determined, and updated image feature 444 is generated.

Figure 6C:
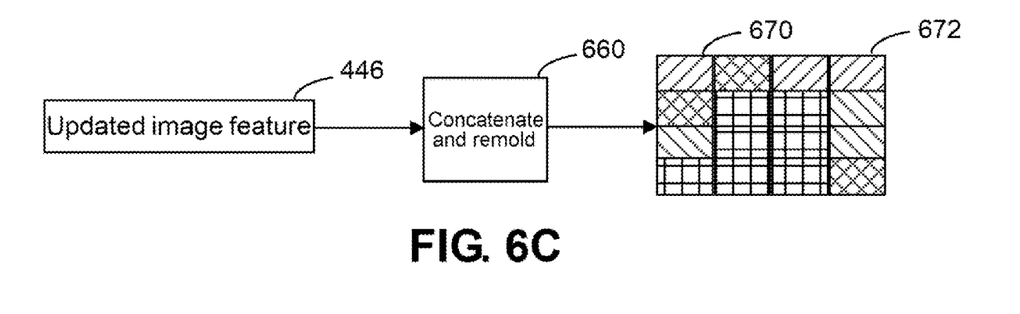
FIG. 6C shows a block diagram of a process for conversion of a generated visual token to an image according to an example implementation of the present disclosure.

FIG. 6C shows a block diagram of a process for conversion of a generated visual token to an image according to an example implementation of the present disclosure. The generated visual token is converted into an image by concatenation and remodeling. As an example, images may be generated in each layer at different resolutions (for example, from $4^2$ to $8^2$), and the images in the previous layer may be gradually upsampled and summed by hopping to the next layer. After the progressive summation, an output of the last layer is regarded as a final result.

As an example, updated image feature 446 is concatenated and remolded via block 660. For example, according to location code 420, each restored image block is placed at corresponding locations 670 and 672. In this way, the watermarked virtual avatar is obtained.

Figure 7:
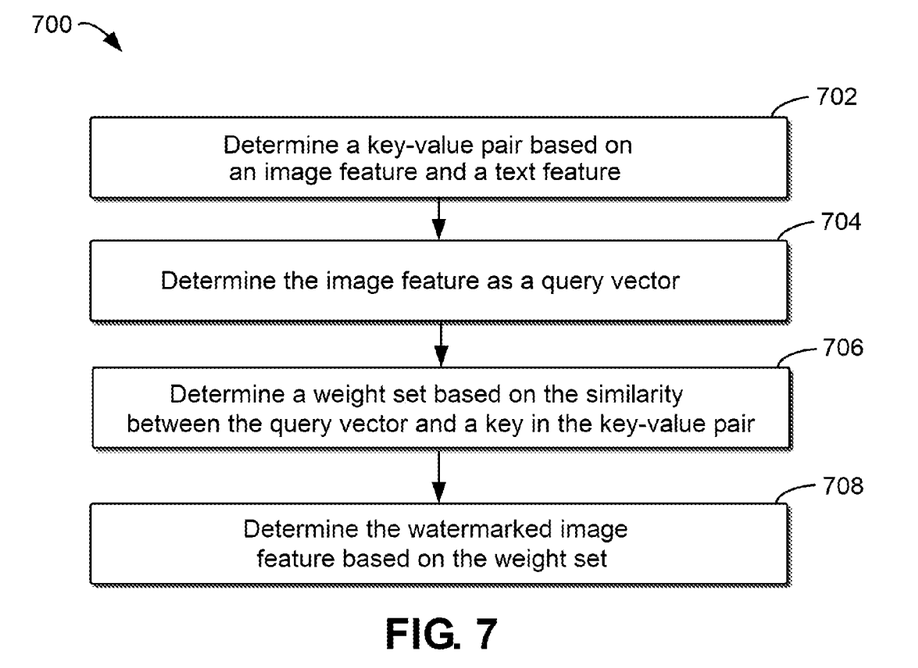
FIG. 7 shows a flow chart of a process for determining a watermarked image feature according to an example implementation of the present disclosure.

FIG. 7 shows a flow chart of process 700 for determining a watermarked image feature according to an example implementation of the present disclosure. Process 700 may be understood with reference to FIG. 6A and FIG. 6B. At block 702, a key-value pair is determined based on the image feature and the text feature. For example, the key-value pair is determined based on normalized image feature 441 and text feature 530. Learned parameter K 650 is used as a key vector, and text feature 530 is used as a value vector.

At block 704, the image feature is determined as a query vector. For example, normalized image feature 441 is used as the query vector. At block 706, a weight set is determined based on a similarity between the query vector and a key in the key-value pair. As an example, S' may be determined based on Equation (3). At block 708, the watermarked image feature is determined based on the weight set. As an example, updated image feature 442 may be determined based on Equation (4).

Figure 8:
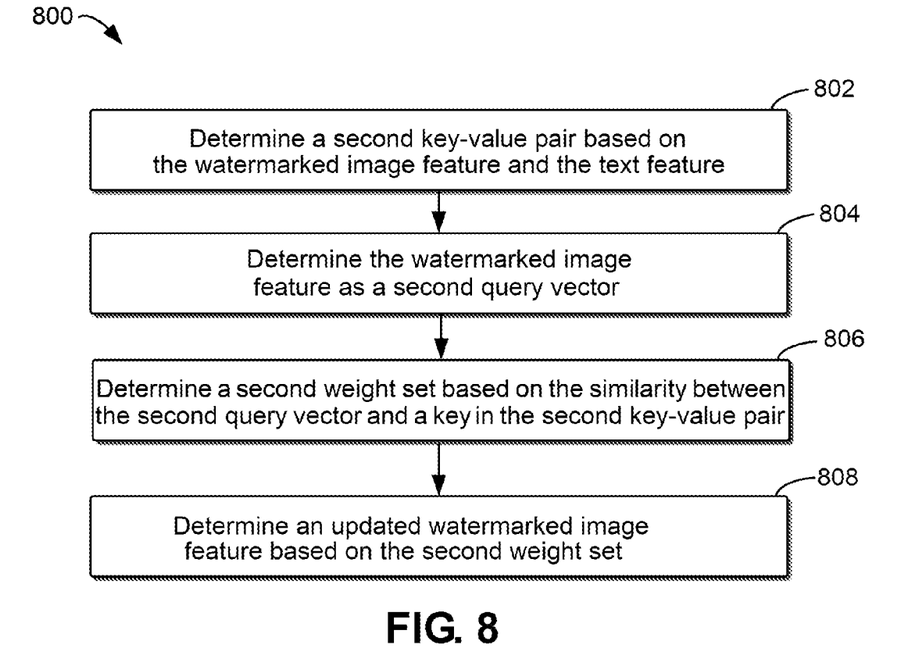
FIG. 8 shows a flow chart of a process for updating a watermarked image feature according to an example implementation of the present disclosure.

FIG. 8 shows a flow chart of process 800 for updating a watermarked image feature according to an example implementation of the present disclosure. Process 800 may also be understood with reference to FIG. 6B. Process 800 may be construed as an iteration of process 700. At block 802, a second key-value pair is determined based on the watermarked image feature and the text feature. For example, the key-value pair is determined based on normalized image feature 441 and text feature 530. Learned parameter K 650 is used as a second key vector, and text feature 530 is used as a second value vector.

At block 804, the watermarked image feature is determined as a second query vector. For example, normalized image feature 441 is used as a query vector (also referred to as second query vector). At block 806, a second weight set is determined based on a similarity between the second query vector and a key in the second key-value pair. As an example, updated S' (also referred to as second weight set) may be determined based on Equation (3). At block 808, an updated watermarked image feature is determined based on the second weight set. As an example, updated image feature 442 may be determined based on Equation (4).

Figure 9:
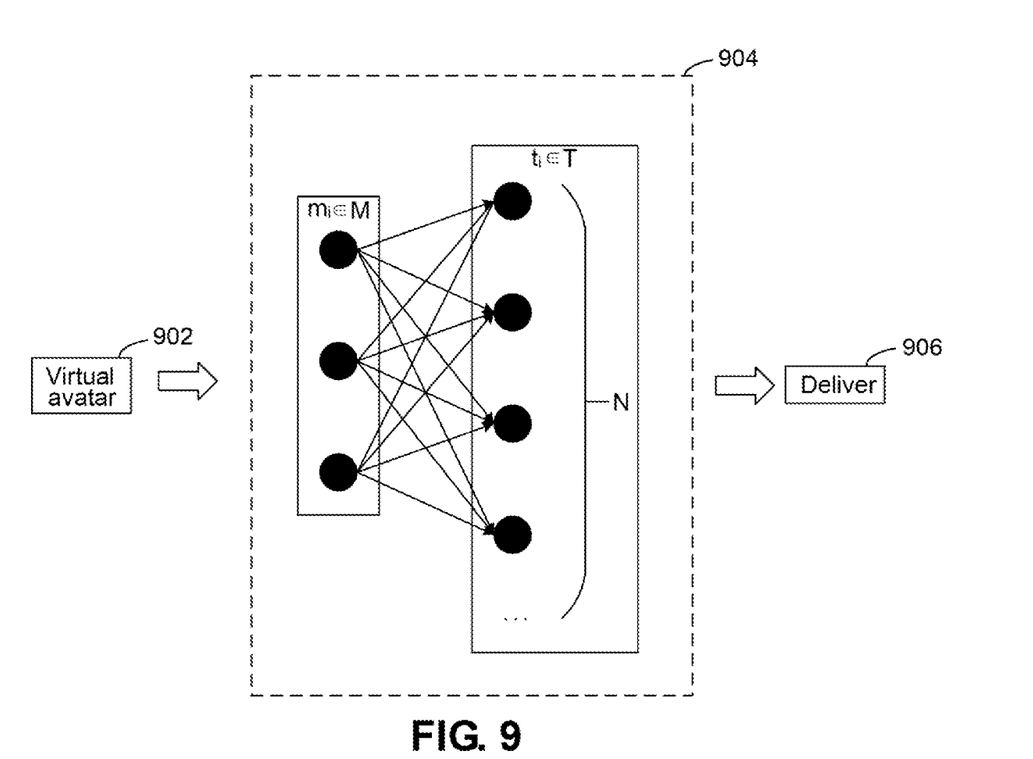
FIG. 9 shows a schematic diagram of a process for delivering a virtual avatar according to an example implementation of the present disclosure.

FIG. 9 shows a schematic diagram of process 900 for delivering a virtual avatar according to an example implementation of the present disclosure. In order to tolerate the distortion of the watermarked virtual avatar without considering all possible attacks, an invariant layer (also referred to as enhanced layer) is provided to reject irrelevant information. The invariant layer introduces a function $\tau:M \to T$, which maps space M to an overcomplete transformation space T. Neurons in this layer are activated in a sparse manner, not only allowing for possible losses in M to improve the robustness, but also enhancing the computational efficiency.

As shown in FIG. 9, 3 channels $m_i$ of virtual avatar 902 are converted into N (N≥3) channels $t_i$ of T through fully connected layer 904 and then delivered 906. N is a redundant parameter. Increasing N implies higher redundancy in T, which implies a higher tolerance for errors in M, leading to increased robustness.

As an example, referring to a contraction autoencoder, the invariant layer adopts a regularization term to achieve the sparse activation, and the activation is obtained, with respect to a training input, through a Frobenius norm of a Jacobian matrix output by the layer. Mathematically, the regularization term P may be written as follows:

$$P = \sum_{i,j} \left( \frac{\partial h_j(X)}{\partial X_i} \right)^2 \quad (5)$$

where $X_i$ denotes the ith input, and $h_j$ denotes the output of the jth hidden unit. Similar to the gradient calculation common in a neural network, the Jacobian matrix may be written as:

$$\frac{\partial h_j(X)}{\partial X_i} = \frac{\partial A(\omega_{ji} X_i)}{\partial \omega_{ji} X_i} \omega_{ji} \quad (6)$$

where A denotes an activation function, and $\omega_{ji}$ denotes a weight between $h_j$ and $X_i$. Hyperbolic tangent (tanh) is used as an activation function for the invariant layer for strong gradients and to avoid bias. A is specified as the hyperbolic tangent, and P may be calculated as:

$$P = \sum_j (1 - h_j^2)^2 \sum_i (\omega_{ji}^T)^2 \quad (7)$$

It should be understood that minimizing the term P alone essentially makes the weights in the layer immutable for all inputs X. However, treating it as a regularization in the total loss calculation enables the layer to only retain useful information while rejecting all other noise and irrelevant information to achieve the robustness.

In addition, each channel in $m_i$ is regarded as a single input in the invariant layer to improve the computational efficiency. Regarding a channel as an input unit only considers three input units of RGB, and therefore, faster computation and larger N may be achieved to obtain higher robustness.

In this way, the watermarked virtual avatar with increased channels may be transmitted securely and completely. At a receiving end, the watermark is extracted, and the metaverse platform verifies the watermark based on information of the user. Based on a result of the verification of the watermark, the metaverse platform determines the authenticity and/or ownership of the virtual avatar.

In some embodiments, method 300 may be performed in a trained machine learning model, such as a Transformer model. As an example, the machine learning model is trained by using sample data, which includes the virtual avatar, the watermark and its corresponding labeled watermarked virtual avatar, and the labeled extracted watermark.

When training the machine learning model, a ground truth value of watermark W is watermark W itself, and a distance between input $w_i$ and model output $w^*_i$ is minimized. The intermediate latent space M in a machine learning model provided in some embodiments of the present disclosure is an image that looks similar to input space C, but contains features extracted from W. Therefore, the model minimizes a distance between a sample for generating intermediate latent space $m_i$ and a sample of input space $c_i$, while maximizing the correlation between a sample from the feature space of $W_f$ and a sample from the feature space of $m_i$. Parameters to be learned are denoted by $\vartheta=[\theta_1, \theta_2, \theta_3, \theta_4, \theta_5]$, and an empirical risk $L(\vartheta)$ of the disclosed model may be denoted by:

$$L(\vartheta) = \frac{1}{B} \sum_{i=1}^{B} [\|w_i^* - w_i\|_1 + \|m_i - c_i\|_1 + \psi(m_i, w_f^i)] \quad (8)$$

where B is the number of training examples, and $\psi$ is a function of computing the correlation, shown as follows:

$$\psi(m_i, w_f^i) = \frac{1}{2} (\|g(f_1(w_f^i)), g(f_1(m_i))\|_1 + \|g(f_2(w_f^i)), g(f_2(m_i))\|_1) \quad (9)$$

where g denotes a Gram matrix of all possible inner products. In addition to $w_f^i$, a convolution block f in a $\sigma_{\theta_2}$ further extracts a feature from $m_i$, so as to maximize the correlations between these features by minimizing distances between Gram matrices. In order to highlight the overall performance rather than a few outliers, a mean absolute error is chosen to calculate the distance. Together with regularization P computed in the invariant layer part, the final loss becomes:

$$L = \mathrm{argmin}_\theta L(\vartheta) + \lambda P \quad (10)$$

where L denotes a loss function; argmin denotes a minimization operation; $\lambda$ denotes a weight; and $\theta$ denotes $[\theta_1, \theta_2, \theta_3, \theta_4, \theta_5]$.

As can be seen, different from the conventional watermark embedding system based on machine learning, the example algorithm in some embodiments is built only based on a Transformer model, because it can process multi-modal data. More importantly, the transmission process is also protected by an enhanced layer. Based on the technical solution of the present disclosure, the whole system is constructed based on the Transformer model, and the Transformer model is adjusted to process image and text information. The text information may be embedded in an image without compromising its appearance.

Figure 10:
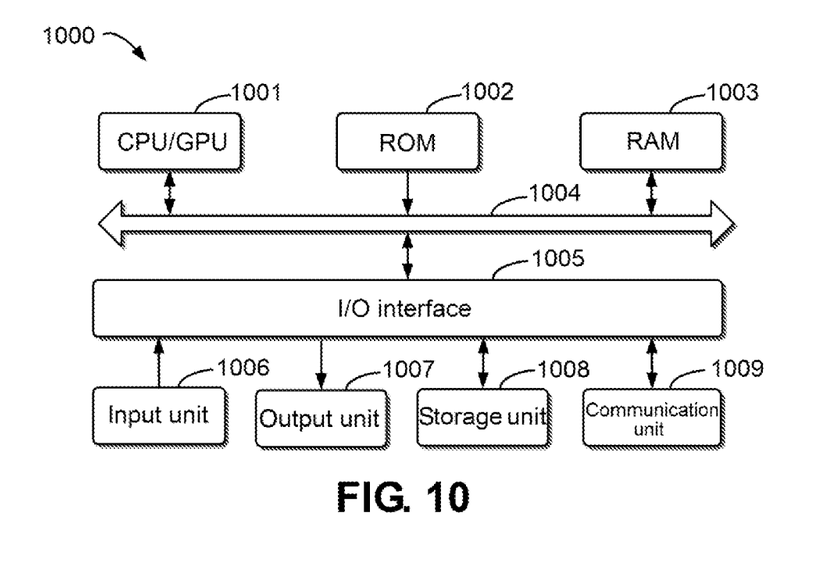
FIG. 10 shows a block diagram of a device for processing a virtual avatar according to an example implementation of the present disclosure.

FIG. 10 shows a schematic block diagram of device 1000 that may be used to implement embodiments of the present disclosure. Device 1000 may be a device or apparatus as described in embodiments of the present disclosure. As shown in FIG. 10, device 1000 includes central processing unit and/or graphics processing unit (CPU/GPU) 1001 that may perform various appropriate actions and processing according to computer program instructions stored in read-only memory (ROM) 1002 or computer program instructions loaded from storage unit 1008 into random access memory (RAM) 1003. Various programs and data needed for the operation of device 1000 may also be stored in RAM 1003. CPU/GPU 1001, ROM 1002, and RAM 1003 are connected to one other through bus 1004. Input/output (I/O) interface 1005 is also connected to bus 1004. Although not shown in FIG. 10, device 1000 may also include a co-processor.

A plurality of components in device 1000 are connected to I/O interface 1005, including: input unit 1006, such as a keyboard and a mouse; output unit 1007, such as various types of displays and speakers; storage unit 1008, such as a magnetic disk and an optical disc; and communication unit 1009, such as a network card, a modem, and a wireless communication transceiver. Communication unit 1009 allows device 1000 to exchange information/data with other devices via a computer network, such as the Internet, and/or various telecommunication networks.

The various methods or processes described above may be executed by CPU/GPU 1001. For example, in some embodiments, the method may be implemented as a computer software program that is tangibly included in a machine-readable medium, such as storage unit 1008. In some embodiments, part or all of the computer program may be loaded and/or installed to device 1000 via ROM 1002 and/or communication unit 1009. When the computer program is loaded into RAM 1003 and executed by CPU/GPU 1001, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated improvements, so as to enable other persons of ordinary skill in the art to understand the various embodiments disclosed herein.

What is claimed is:

1. A method of processing a virtual avatar, comprising:
generating an image feature of the virtual avatar based on a plurality of image blocks of the virtual avatar and corresponding positions of the plurality of image blocks in the virtual avatar;
generating, based on a watermark to be added to the virtual avatar, a text feature associated with text of the watermark; and
generating a watermarked virtual avatar based on the image feature and the text feature, wherein the watermark is invisible to human beings and identifies an identity of a user of the virtual avatar in a metaverse;
wherein generating the watermarked virtual avatar based on the image feature and the text feature comprises:
determining a key-value pair based on the image feature and the text feature, the key-value pair comprising (i) a key that represents a semantic embedding parameter of a self-attention mechanism in a machine learning model, and (ii) a value that represents the text feature;
determining the image feature as a query vector;
determining a weight set based on a similarity between the query vector and a key in the key-value pair; and
determining, based on the weight set, a watermarked image feature;
wherein generating the watermarked virtual avatar further comprises processing the watermarked virtual avatar through an invariant layer of the machine learning model, the invariant layer comprising at least one fully-connected layer of the machine learning model and implementing a mapping function that converts a first number of image channels of an input image space of the watermarked virtual avatar into a second number of image channels of a transformed image space of an updated watermarked virtual avatar, the second number being greater than the first number.

2. The method according to claim 1, wherein generating the image feature of the virtual avatar comprises:
dividing the virtual avatar into a plurality of visual marks, wherein each visual mark in the plurality of visual marks is represented by a vector of a predetermined length;
generating a corresponding position code for each of the visual marks; and
generating the image feature based on the plurality of visual marks and the corresponding position codes.

3. The method according to claim 1, wherein generating the text feature associated with the text of the watermark comprises:
dividing the watermark into a plurality of text lemmas, wherein each text lemma in the plurality of text lemmas comprises a word; and
generating the text feature based on the plurality of text lemmas.

4. The method according to claim 1, wherein the key-value pair is a first key-value pair, the query vector is a first query vector, the weight set is a first weight set, and the method further comprises:
determining a second key-value pair based on the watermarked image feature and the text feature;
determining the watermarked image feature as a second query vector;
determining a second weight set based on a similarity between the second query vector and a key in the second key-value pair; and
determining, based on the second weight set, an updated watermarked image feature.

5. The method according to claim 4, wherein generating the watermarked virtual avatar based on the image feature and the text feature comprises:
generating the watermarked virtual avatar based on the updated watermarked image feature and the text feature.

6. The method according to claim 1, further comprising:
sending the updated watermarked virtual avatar to a metaverse platform; and
sending an instruction for extracting the watermark in the watermarked virtual avatar to the metaverse platform.

7. The method according to claim 6, further comprising:
causing, in response to the watermark being extracted, the metaverse platform to verify the watermark based on information of the user; and
causing, based on a result of the verification of the watermark, the metaverse platform to determine at least one of authenticity and ownership of the virtual avatar.

8. The method according to claim 1, wherein the method is performed by a trained machine learning model, and the method further comprises:
    training the machine learning model by using sample data, wherein the sample data comprises the virtual avatar, the watermark and a corresponding labeled watermarked virtual avatar, and a labeled extracted watermark.

9. An electronic device, comprising:
    a processor; and
    a memory coupled to the processor, wherein the memory has instructions stored therein which, when executed by the processor, cause the electronic device to execute actions comprising:
    generating an image feature of a virtual avatar based on a plurality of image blocks of the virtual avatar and corresponding positions of the plurality of image blocks in the virtual avatar;
    generating, based on a watermark to be added to the virtual avatar, a text feature associated with text of the watermark; and
    generating a watermarked virtual avatar based on the image feature and the text feature, wherein the watermark is invisible to human beings and identifies an identity of a user of the virtual avatar in a metaverse;
    wherein generating the watermarked virtual avatar based on the image feature and the text feature comprises:
    determining a key-value pair based on the image feature and the text feature, the key-value pair comprising (i) a key that represents a semantic embedding parameter of a self-attention mechanism in a machine learning model, and (ii) a value that represents the text feature;
    determining the image feature as a query vector;
    determining a weight set based on a similarity between the query vector and a key in the key-value pair; and
    determining, based on the weight set, a watermarked image feature;
    wherein generating the watermarked virtual avatar further comprises processing the watermarked virtual avatar through an invariant layer of the machine learning model, the invariant layer comprising at least one fully-connected layer of the machine learning model and implementing a mapping function that converts a first number of image channels of an input image space of the watermarked virtual avatar into a second number of image channels of a transformed image space of an updated watermarked virtual avatar, the second number being greater than the first number.

10. The electronic device according to claim 9, wherein generating the image feature of the virtual avatar comprises:
    dividing the virtual avatar into a plurality of visual marks, wherein each visual mark in the plurality of visual marks is represented by a vector of a predetermined length;
    generating a corresponding position code for each of the visual marks; and
    generating the image feature based on the plurality of visual marks and the corresponding position codes.

11. The electronic device according to claim 9, wherein generating the text feature associated with the text of the watermark comprises:
    dividing the watermark into a plurality of text lemmas, wherein each text lemma in the plurality of text lemmas comprises a word; and
    generating the text feature based on the plurality of text lemmas.

12. The electronic device according to claim 9, wherein the key-value pair is a first key-value pair, the query vector is a first query vector, the weight set is a first weight set, and the actions further comprise:
    determining a second key-value pair based on the watermarked image feature and the text feature;
    determining the watermarked image feature as a second query vector;
    determining a second weight set based on a similarity between the second query vector and a key in the second key-value pair; and
    determining, based on the second weight set, an updated watermarked image feature.

13. The electronic device according to claim 12, wherein generating the watermarked virtual avatar based on the image feature and the text feature comprises:
    generating the watermarked virtual avatar based on the updated watermarked image feature and the text feature.

14. The electronic device according to claim 9, wherein the actions further comprise:
    sending the updated watermarked virtual avatar to a metaverse platform; and
    sending an instruction for extracting the watermark in the watermarked virtual avatar to the metaverse platform.

15. The electronic device according to claim 14, wherein the actions further comprise:
    causing, in response to the watermark being extracted, the metaverse platform to verify the watermark based on information of the user; and
    causing, based on a result of the verification of the watermark, the metaverse platform to determine at least one of authenticity and ownership of the virtual avatar.

16. A computer program product tangibly stored on a non-transitory computer-readable medium and comprising computer-executable instructions, wherein the computer-executable instructions, when executed by a device, cause the device to implement a method of processing a virtual avatar, the method comprising:
    generating an image feature of the virtual avatar based on a plurality of image blocks of the virtual avatar and corresponding positions of the plurality of image blocks in the virtual avatar;
    generating, based on a watermark to be added to the virtual avatar, a text feature associated with text of the watermark; and
    generating a watermarked virtual avatar based on the image feature and the text feature, wherein the watermark is invisible to human beings and identifies an identity of a user of the virtual avatar in a metaverse;
    wherein generating the watermarked virtual avatar based on the image feature and the text feature comprises:
    determining a key-value pair based on the image feature and the text feature, the key-value pair comprising (i) a key that represents a semantic embedding parameter of a self-attention mechanism in a machine learning model, and (ii) a value that represents the text feature;
    determining the image feature as a query vector;
    determining a weight set based on a similarity between the query vector and a key in the key-value pair; and
    determining, based on the weight set, a watermarked image feature;
    wherein generating the watermarked virtual avatar further comprises processing the watermarked virtual avatar through an invariant layer of the machine learning model, the invariant layer comprising at least one fully-connected layer of the machine learning model and implementing a mapping function that converts a first number of image channels of an input image space of the watermarked virtual avatar into a second number of image channels of a transformed image space of an updated watermarked virtual avatar, the second number being greater than the first number.

17. The computer program product of claim 16, wherein generating the image feature of the virtual avatar comprises:
dividing the virtual avatar into a plurality of visual marks, wherein each visual mark in the plurality of visual marks is represented by a vector of a predetermined length;
generating a corresponding position code for each of the visual marks; and
generating the image feature based on the plurality of visual marks and the corresponding position codes.

18. The computer program product of claim 16, wherein generating the text feature associated with the text of the watermark comprises:
dividing the watermark into a plurality of text lemmas, wherein each text lemma in the plurality of text lemmas comprises a word; and
generating the text feature based on the plurality of text lemmas.

19. The computer program product of claim 16, wherein the key-value pair is a first key-value pair, the query vector is a first query vector, the weight set is a first weight set, and the method further comprises:
determining a second key-value pair based on the watermarked image feature and the text feature;
determining the watermarked image feature as a second query vector;
determining a second weight set based on a similarity between the second query vector and a key in the second key-value pair; and
determining, based on the second weight set, an updated watermarked image feature.

20. The computer program product of claim 19, wherein generating the watermarked virtual avatar based on the image feature and the text feature comprises:
generating the watermarked virtual avatar based on the updated watermarked image feature and the text feature.

* * * * *